Sept. 2, 1958   L. J. BISHOP ET AL   2,850,141
WORK HANDLING AND TESTING APPARATUS
Filed July 26, 1954   8 Sheets-Sheet 1

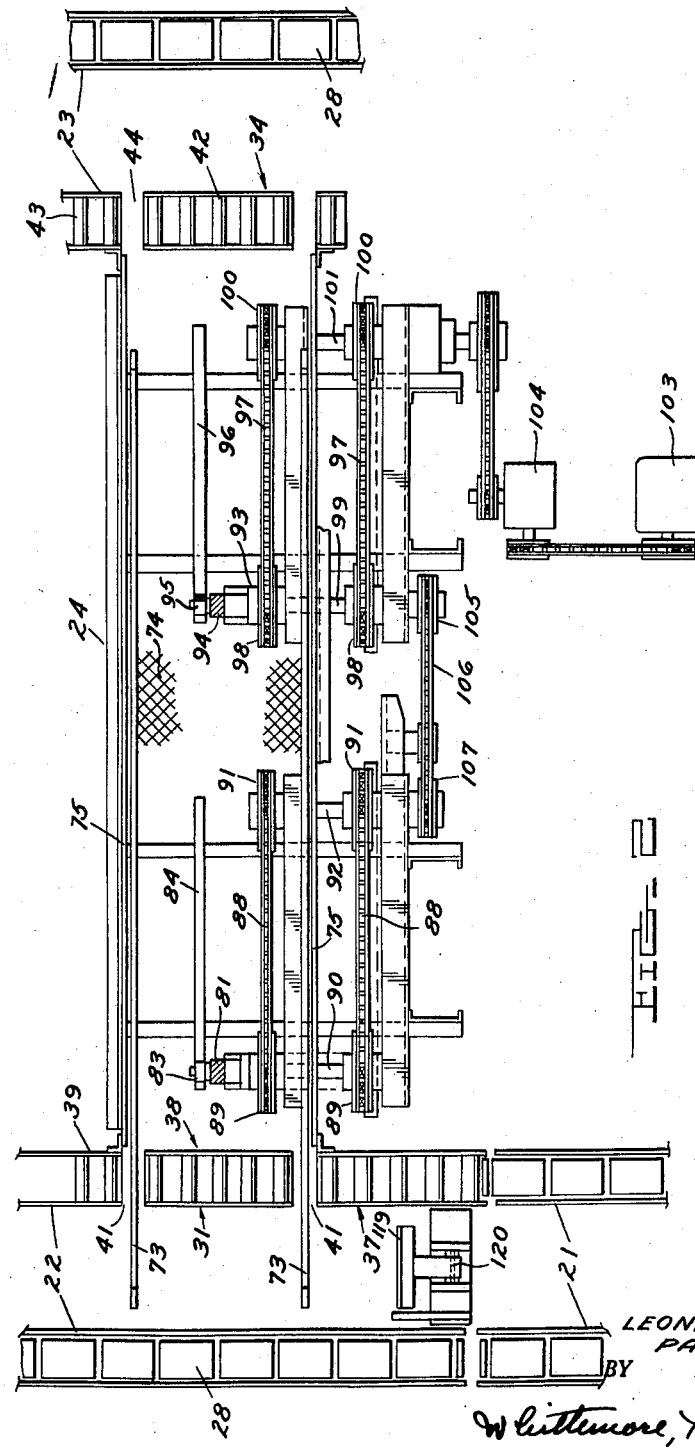

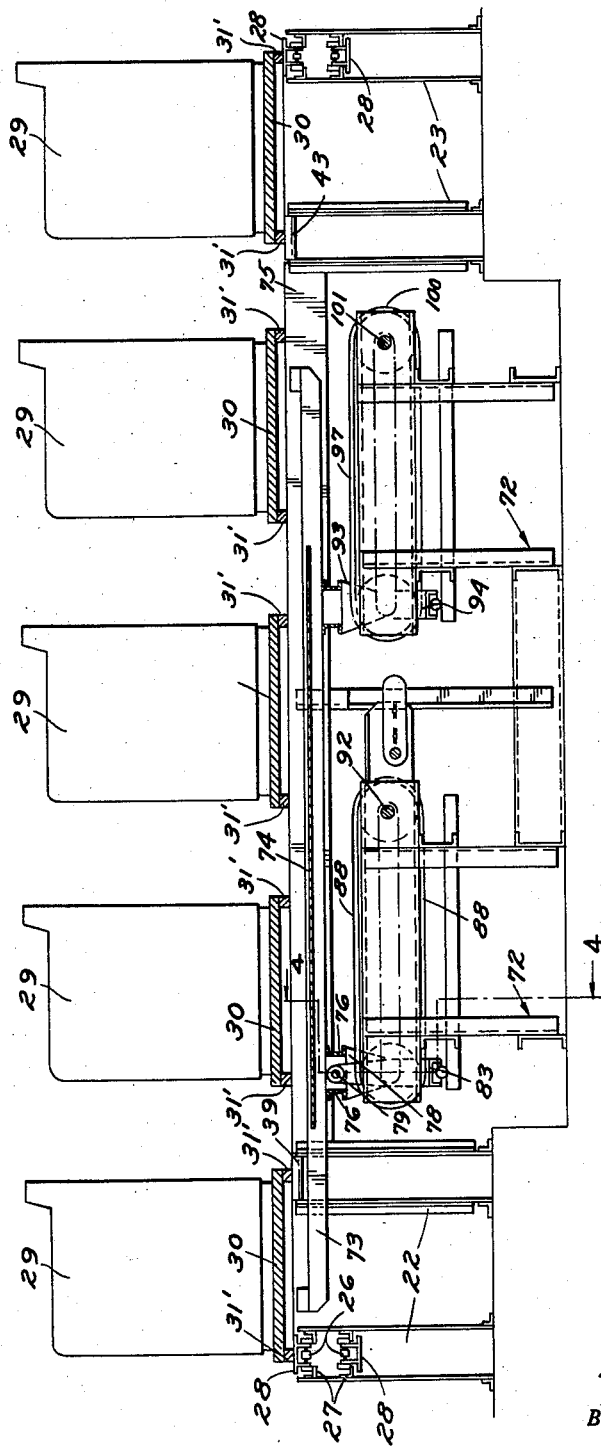

Sept. 2, 1958 L. J. BISHOP ET AL 2,850,141
WORK HANDLING AND TESTING APPARATUS
Filed July 26, 1954 8 Sheets-Sheet 4
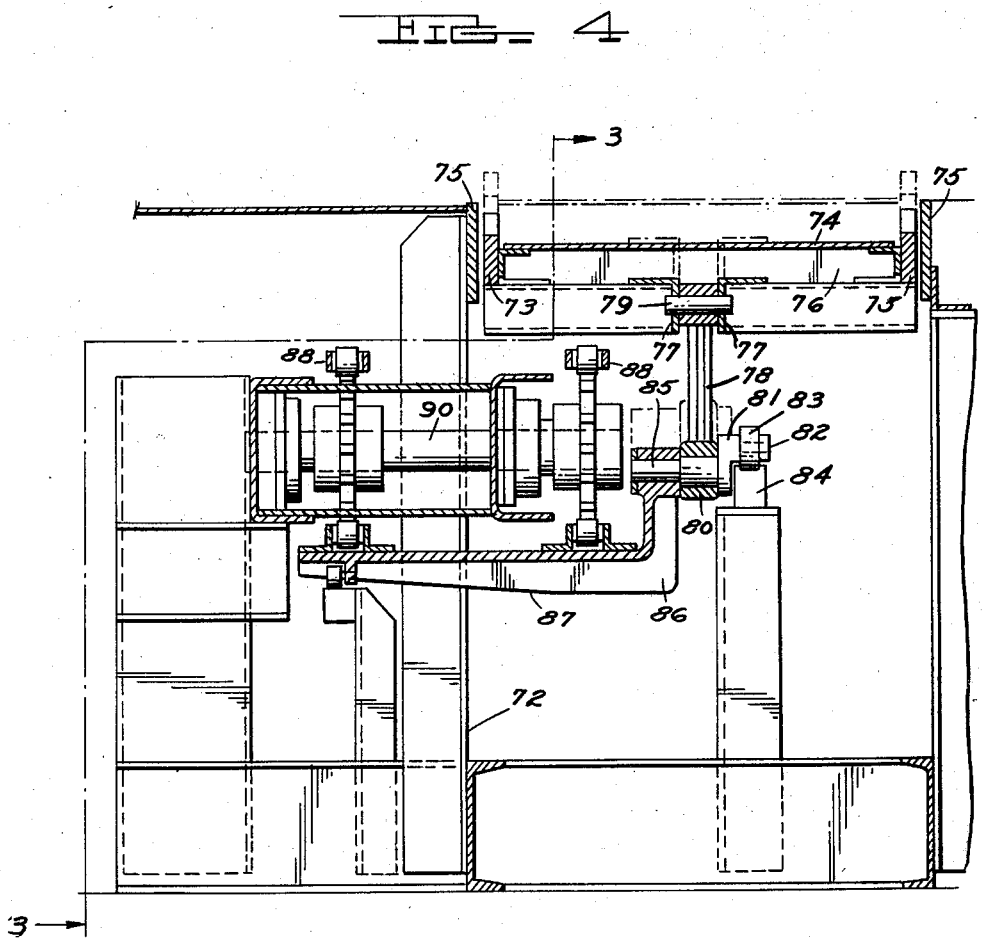
INVENTORS
LEONARD J. BISHOP
PAUL KLAMP
BY
Whittemore, Hulbert & Belknap
ATTORNEYS

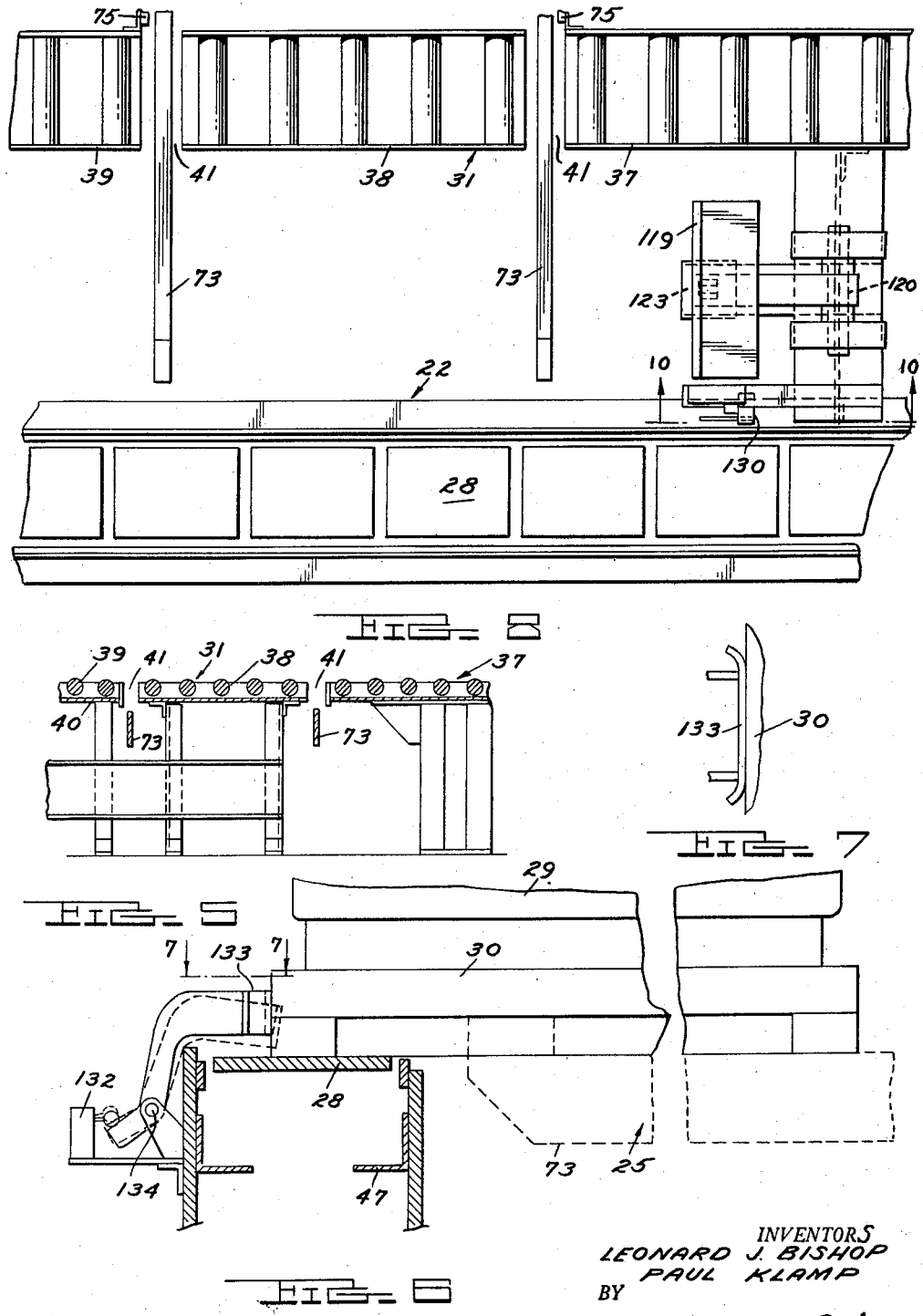

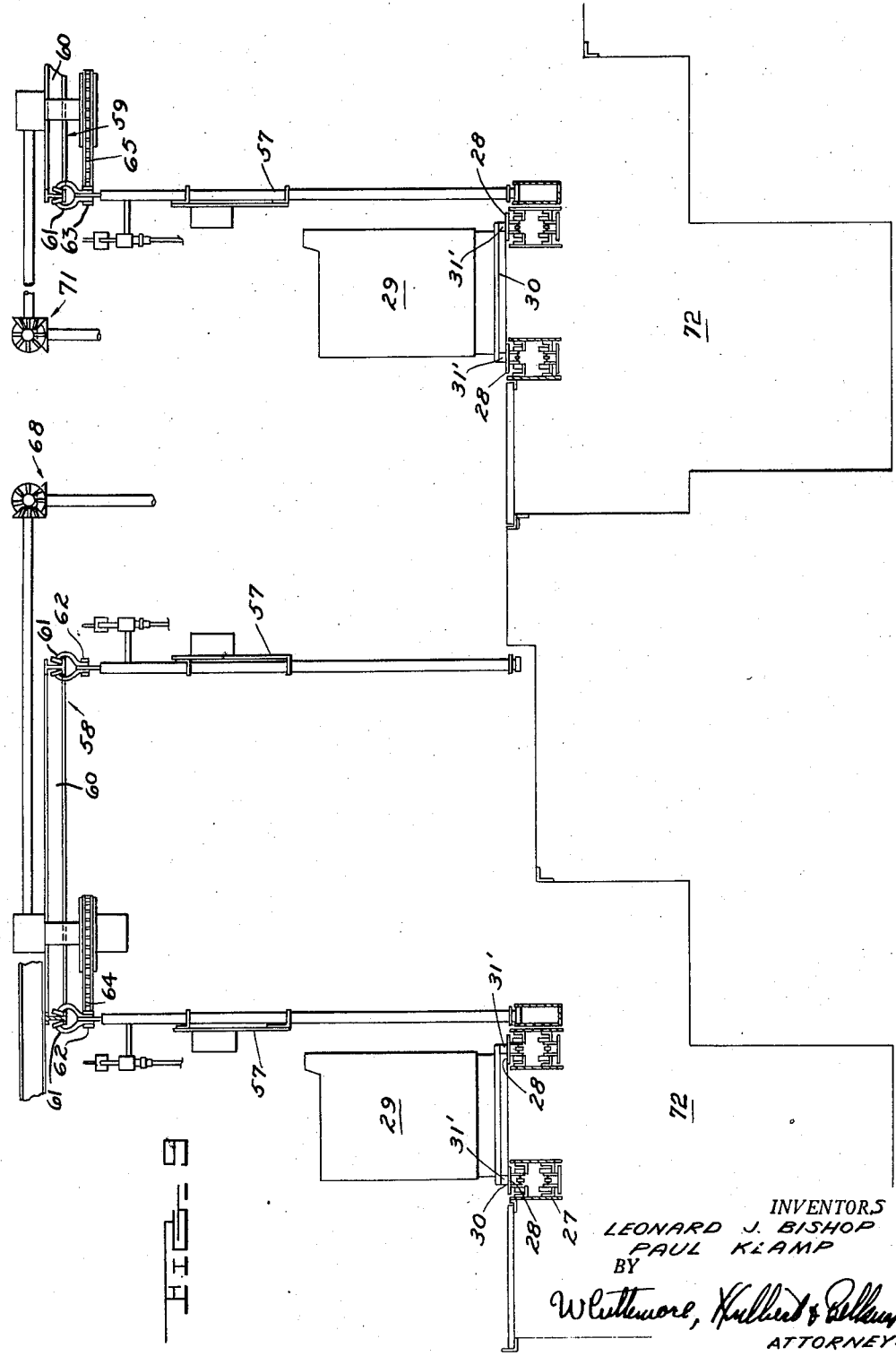

Sept. 2, 1958 L. J. BISHOP ET AL 2,850,141
WORK HANDLING AND TESTING APPARATUS
Filed July 26, 1954 8 Sheets-Sheet 7
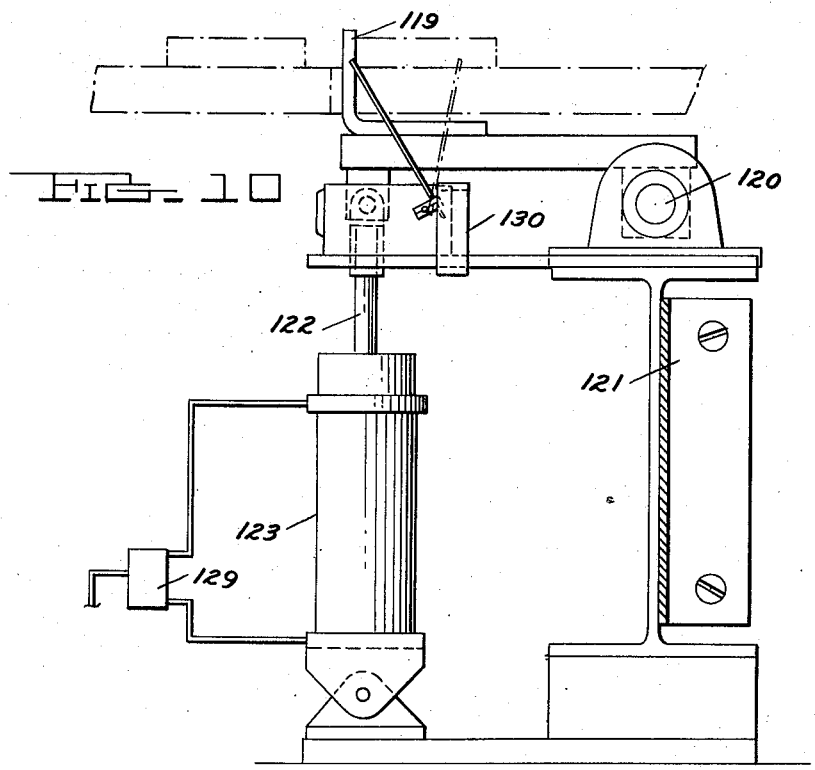
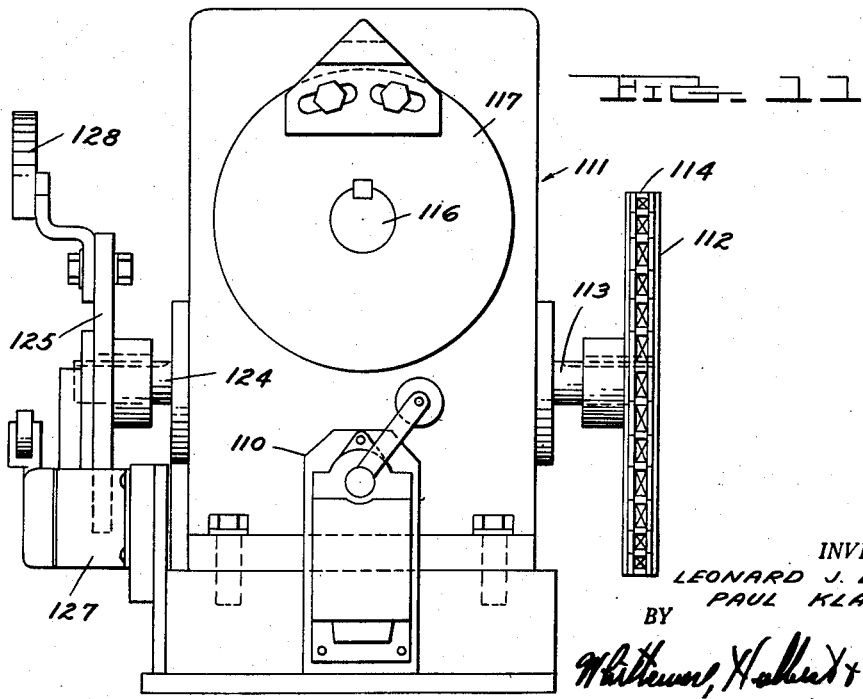
INVENTORS
LEONARD J. BISHOP
PAUL KLAMP
BY
ATTORNEYS

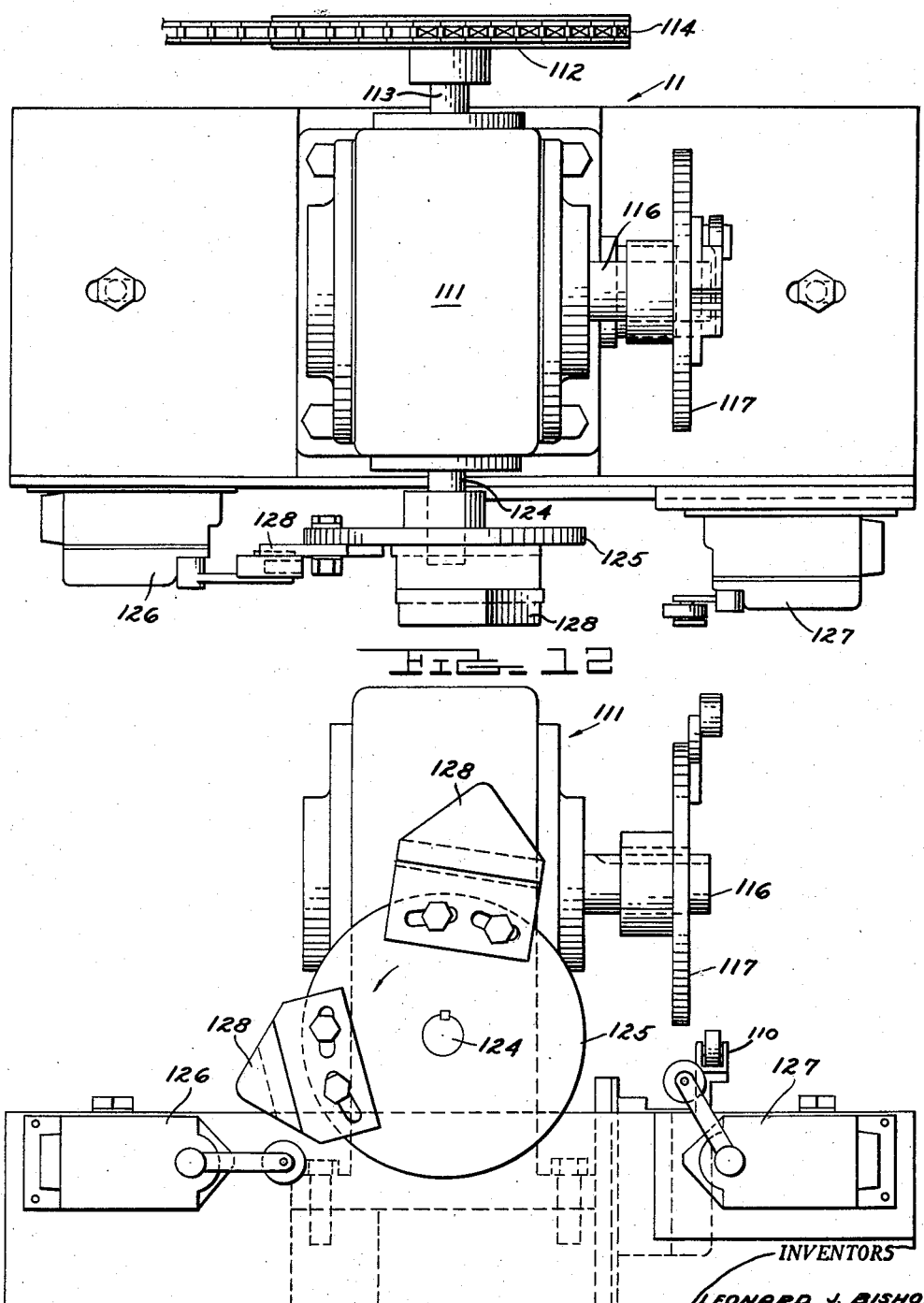

United States Patent Office 2,850,141
Patented Sept. 2, 1958

2,850,141
WORK HANDLING AND TESTING APPARATUS

Leonard J. Bishop, Birmingham, and Paul Klamp, Detroit, Mich., assignors to Mechanical Handling Systems, Inc., Detroit, Mich., a corporation of Michigan Application July 26, 1954, Serial No. 445,664

20 Claims. (Cl. 198—21)

This invention relates to work handling apparatus embodying a system of conveyors.

In the manufacture of certain end products, it is frequently necessary or desirable to test the performance of the products before they are finally shipped to the consumer. As an example, in the manufacture of automatic washers it is desirable to subject certain of the washers to a complete test and to subject the remaining washers to superficial tests.

Testing the operation of such end products as automatic washers is time consuming and this is especially true in cases where those washers selected for spot testing are run through a complete cycle. With this in view, it is an object of the present invention to substantially expedite testing of the products by providing a conveyor system rendering it possible to perform both the superficial and complete tests of the products while the latter are being advanced.

It is another object of this invention to provide a conveyor system having unique transfer means for transferring an article from a first conveyor to a second conveyor and for subsequently returning the article to the first conveyor.

It is still another object of this invention to provide improved timing mechanism for controlling the operation of the transfer means rendering it possible to transfer certain articles from the first conveyor to the second conveyor and to return the articles from the second conveyor to vacant spaces on the first conveyor.

It is a further object of this invention to provide driving means for the two aforesaid conveyors rendering it possible to drive the second conveyor at a slower rate than the first conveyor so that a greater period of time is available to test the articles being advanced by the second conveyor without interfering with or interrupting advancement of the articles by the first conveyor. Thus articles being advanced by the first conveyor may be spot tested with a minimum loss of time and with no additional handling of the articles.

It is still a further object of this invention to provide a conveyor system of the above type having a third conveyor for delivering articles to the second conveyor in a controlled manner so that the articles assume predetermined positions on the second conveyor with respect to various testing stations spaced along the path of the second conveyor.

The foregoing as well as other objects will be made more apparent as this description proceeds especially when considered in connection with the accompanying drawings, wherein:

Figure 2 is a fragmentary semi-diagrammatic plan view of the transfer conveyor shown in Figure 1;

Figure 3 is a sectional view taken on the line 3—3 of Figure 4;

Figure 4 is a sectional view taken on the line 4—4 of Figure 3;

Figure 5 is a fragmentary sectional view taken substantially on the line 5—5 of Figure 1;

Figure 6 is a fragmentary sectional view taken on the line 6—6 of Figure 1;

Figure 7 is a fragmentary plan view looking in the direction of the arrows 7—7 of Figure 6;

Figure 8 is a fragmentary elevational view of a part of the conveyor shown in Figure 1;

Figure 9 is a semi-diagrammatic sectional view taken on the line 9—9 of Figure 1;

Figure 10 is a fragmentary sectional view taken on the line 10—10 of Figure 8;

Figure 11 is an end elevational view of the timing device employed in the conveyor system;

Figure 12 is a plan view of the timing device shown in Figure 11; and

Figure 13 is a side elevational view of the timing device shown in Figure 11.

Figure 1:
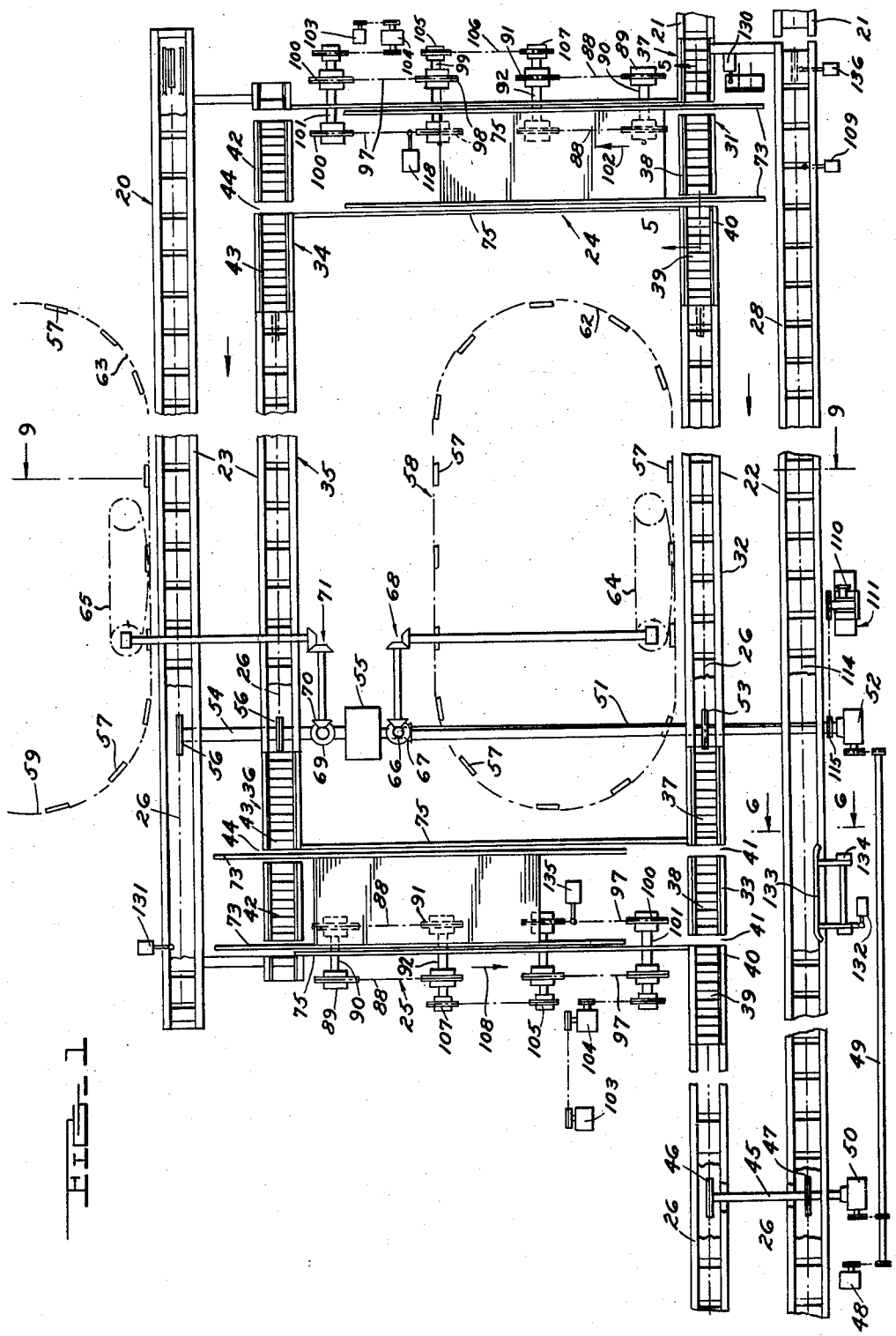
Figure 1 is a fragmentary semi-diagrammatic plan view of a conveyor system embodying the features of this invention.

The work handling system selected herein for the purpose of illustration is primarily designed to facilitate the manufacture of home laundry equipment such, for example, as automatic clothes washers. More particularly the work handling system disclosed herein may be advantageously employed to handle the washers as the latter are inspected and tested for performance before being shipped to the consumer. However, it will become apparent as this description proceeds that the work handling system is not restricted to the manufacture of clothes washers but, on the contrary, may be used for the purpose of handling numerous different types of articles during their manufacture.

With the above in view reference is made more in detail to the drawings wherein the numeral 20 designates a typical work handling system embodying the features of this invention. As shown in Figure 1 of the drawings, the work handling system 1 comprises a loading conveyor 21, a short test conveyor 22 aligned with the loading conveyor 21, a long test conveyor 23 spaced laterally from the short test conveyor 22, a transfer conveyor 24 extending between the receiving ends of the test conveyors, and a second transfer conveyor 25 extending between the delivery ends of the test conveyors.

For the purpose of illustration, all of the aforesaid conveyors are shown as being of the flat top or platform type which are well known in the art and hence need not be described in detail. Briefly, each conveyor comprises laterally spaced endless links type chains 26 (Figures 3 and 9) respectively supported on tracks 27 and having flat top sections 28 pivotally connected thereto. This type of conveyor is especially suitable in cases where the articles to be handled are of substantial size such, for example, as automatic clothes washers. The numeral 29 (Figure 9) designates a typical clothes washer and the numeral 30 indicates a pallet on which the washer 29 is seated. In accordance with conventional practice, the pallets 30 have skid bars 31' at opposite sides thereof and these bars rest on the flat top sections 28 of the conveyors.

Referring again to Figure 1 of the drawings it will be noted that the inner side of the short test conveyor 22 has three co-extensive sections 31, 32 and 33. Also the inner side of the long test conveyor 23 has three co-extensive sections 34, 35 and 36. The sections 31 and 34 are respectively positioned in registration with opposite ends of the transfer conveyor 24, and the sections 33 and 36 are respectively located in registration with opposite ends of the transfer conveyor 25. The section 31 is shown in Figure 8 and comprises three groups of rollers 37, 38 and 39 respectively. The rollers are supported on an elevated frame structure 40 with their axes extending at right angles to the path of travel of the conveyor 22 and with the intermediate group 38 positioned directly opposite the receiving end of the transfer conveyor 24. The opposite ends of the intermediate group 38 are spaced from the adjacent ends of the end groups to provide clearance spaces 41 for respectively receiving parts of the transfer conveyor to be more fully hereinafter described.

The section 33 is identical in construction to the section 31 and corresponding parts are designated by the same reference numerals. The sections 34 and 36 each have two groups of rollers 42 and 43 suitably rotatably supported on frame structure with the axes of the rollers perpendicular to the path of the conveyor 23. The groups 42 are respectively supported directly opposite the adjacent ends of the transfer conveyors and clearance spaces 44 are provided between the groups 42, 43 for receiving parts of the transfer conveyors during operation of the latter. It will be apparent from Figure 1 of the drawings that the rollers of all of the groups are mounted for free rotation and that the articles 29 are advanced over the rollers by the outer sides of the test conveyors. It will also be noted that the intermediate sections 32 and 35 of the inner sides of the respective test conveyors are of the flat top or platform type construction briefly described above and these sections are driven by the chains 26.

In Figure 1 of the drawings, the numeral 45 designates a cross shaft which extends transversely of the conveyor 22 rearwardly beyond the roller section 33 and having sprockets 46 and 47 secured thereto in lateral spaced relationship. The sprocket 46 meshes with the chain 26 for driving the portion of the inner side of the conveyor 22 extending rearwardly beyond the roller section 33. The sprocket 47 meshes with the chain 26 for the outer side of the conveyor 22 and both sprockets are driven by an electric motor 48. The motor 48 is operatively connected to a drive shaft 49 and the latter is operatively connected to the cross shaft 45 through a speed reducer 50. The drive shaft 49 is also operatively connected to a second cross shaft 51 through a speed reducer 52 and a sprocket 53 is secured to the shaft 51 in a position to mesh with the chain 26 for driving the intermediate section 32 of the inner side of the conveyor 22. The driving mechanism is such that both sides of the conveyor 22 are driven at a uniform pre-selected speed depending on the nature of the operations to be performed on the articles supported by the conveyor 22.

Referring again to Figure 1 of the drawings, a shaft 54 is connected to the inner end of the shaft 51 by a speed reducer 55 and a pair of sprockets 56 are secured to the shaft 54 in positions to respectively mesh with the chains 26 associated with opposite sides of the conveyor 23. Thus, the conveyor 23 is driven at a speed less than the speed of the conveyor 22 and this is desirable in the present instance where the time required to completely test the articles being advanced by the conveyor 23 is greater than the time required to short test the articles being advanced by the conveyor 22. The above construction is such that complete tests may be performed on the articles carried by the conveyor 23 while these articles move throughout the same distance as the articles on the conveyor 22 being subjected to somewhat shorter tests.

The articles 29 are tested while being advanced by the conveyors 22 and 23, between the transfer conveyors 24 and 25. The particular test equipment forms no part of the present invention and hence is not shown in detail. However, in cases where automatic washers are being handled, the test equipment comprises panels indicated generally in Figures 1 and 9 by the numeral 57 and these panels have water and electrical power supply means. In any case, the test panels are carried by endless conveyors 58 and 59, respectively supported above the conveyors 22 and 23. As shown in Figure 9 of the drawings, the conveyors 58 and 59 each have an endless track 60 and trolleys 61 supported on the track. The test panels 57 are suspended from the respective trolleys 61 and the latter are moved around the respective tracks 58 and 59 by link type chains 62 and 63 secured to the trolleys.

The chains 62 and 63 are respectively driven in the appropriate directions by crawler type drive chains 64 and 65 in a manner well known to this art. The chain 62 for the conveyor 58 is driven at the same rate as the conveyor 22 by a vertical shaft 66 having the lower end connected to the shaft 51 by beveled gearing 67 and having the upper end operatively connected to one sprocket of the chain 64 by suitable shafts and gearing indicated generally by the numeral 68. The chain 63 for the conveyor 59 is driven at the same rate as the conveyor 23 by a vertical shaft 69 having the lower end connected to the shaft 54 by beveled gearing 70 and having the upper end operatively connected to the drive sprocket of the chain 65 by suitable shafting and gearing indicated generally by the numeral 71. As shown in Figure 9 of the drawings, suitable pits 72 are provided below the conveyors 22 and 23 to provide access to the test panels 57 during operation of the conveyors.

The transfer conveyor 24 is best shown in Figures 1–4 of the drawings. The purpose of the conveyor 24 is to transfer certain articles 29 from the receiving end of the conveyor 22 to the corresponding end of the conveyor 23. The conveyor 24 has suitable frame structure 72 extending between the receiving ends of the test conveyors 22 and 23. Also extending between the receiving ends of the test conveyors is a pair of laterally spaced elongated lift bars 73 connected together intermediate the ends in parallel relationship by a platform 74. The bars 73 are spaced laterally from one another a distance predetermined to register the outer ends of the bars with the respective clearance spaces 41 provided in the free roller section 31 of the conveyor 22, and to respectively register the inner ends of the bars with the space at the front end of the free roller section 34 of the conveyor 23 and with the clearance space 44 provided between the groups of rollers 42 and 43 of the section 34, as shown in Figures 1 and 2 of the drawings.

The bars 73 are supported by the frame structure 72 for movement back and forth in the direction of their length throughout a closed cyclic path which will be more fully hereinafter described. Briefly the bars 73 are first moved outwardly along the bottom run of the cyclic path to project the outer ends of the bars beneath the rollers of the section 31 of the conveyor 22 (Figure 3), and then the bars are moved upwardly through the clearance spaces 41 to the top run of the cyclic path which is at a higher elevation than the groups of rollers of the conveyor section 31. In Figure 3 of the drawings, an article 29 and a pallet 30 are shown in a position on the conveyor 22 directly opposite the receiving end of the transfer conveyor 24 so that upward movement of the bars 73 raises or lifts the article 29 off the conveyor 22. In this connection it will also be noted from Figure 3 that when the bars 73 are at the limit of their stroke in an outward direction they terminate short of the outer side of the conveyor 22 and do not interfere with the operation of the latter. However, the outer ends of the bars 73 project outwardly beyond the median centerline of the pallet 30 a sufficient distance to assure lifting the article 29 off the conveyor 22 as the bars move upwardly to the top run of their cyclic path of travel.

When the bars 73 have been moved upwardly sufficiently to lift the adjacent article 29 off the conveyor 22, the bars are moved inwardly along the top run of the cyclic path sufficiently to locate the article 29 and pallet 30 at the inner side of the conveyor 22 above horizontal supports 75 which are secured to the frame structure 72 at opposite sides of the pair of bars 73. Following movement of the bars 73 to their innermost positions, the bars are lowered and returned to the bottom run of their cyclic path. As the bars 73 are lowered to the bottom run of the cyclic path of travel of the bars, the article 29 and associated pallet are deposited on the supports 75. Thus, during consecutive movements of the bars 73 throughout their cyclic path of travel, the article 29 is advanced step by step along the supports 75 toward the receiving end of the conveyor 23.

The length of the bars 73 are such that when the bars are at the inner end of their stroke, the adjacent ends of the bars overlie the roller section 34 of the conveyor 23. Thus, when the bars 73 return to the bottom run of their cyclic path, they pass downwardly along opposite ends of the group of rollers 42. It follows, therefore, that movement of the bars 73 throughout one complete cycle also lifts an article 29 off the inner ends of the supports 75 and deposits the same on the conveyor 23.

As shown in Figures 3 and 4 of the drawings, the bars 73 are connected together adjacent the outer ends by laterally spaced cross braces 76 having angle members 77 secured thereto intermediate the ends thereof in lateral spaced relationship. An arm 78 has the upper end projecting between the angle members 77 and is pivoted to the members 77 by a pin 79 having its axis extending perpendicular to the arms 73. The lower end of the arm 78 is journaled on a pin 80 of a crank 81 having a second pin 82 offset with respect to the pin 80 a distance predetermined to provide the vertical travel of the arms 73 required to transfer articles 29 from the conveyor 22 to the conveyor 23. A roller 83 is rotatably supported on the pin 82 and is engaged with a length of track 84. The track 84 is supported on the frame structure 72 and extends lengthwise of the bars 73.

The pin 80 has an axial extension 85 which is secured to a bracket 86 having an arm portion 87 offset laterally from the axis of the pin 80 and overlying a pair of laterally spaced link chains 88. The chains 88 respectively extend around sprockets 89 secured to a shaft 90 which is journaled on the frame structure 72 of the transfer conveyor 24 adjacent the outer end of the latter. The inner ends of the chains 88 respectively extend around sprockets 91 which are secured to a shaft 92 extending parallel to the shaft 90 and spaced inwardly from the shaft 90, as shown in Figure 1. Referring again to Figure 4 it will be noted that the arm 87 is fastened to the chains 88 and that the chains extend parallel to the guide 84. The arrangement is such that as the bracket 86 is moved around the path of travel of the chains 88 by the latter, the roller 83 on the crank 81 travels back and forth along the guide 84. However, during the intervals the bracket 86 travels about the sprockets 89, the crank 81 is rotated by the bracket 86 about the axis of the roller crank pin 82 so as to lift the bars 73 at the outer end of their stroke and to lower the bars 73 at the inner end of their stroke. Due to the crank arrangement the vertical lift of the bars 73 is substantially less than the diameter of the sprockets 89 and hence the force required to raise the articles 29 is reduced to a minimum.

In order to maintain the bars 73 substantially parallel to a horizontal plane throughout movement of the bars 73 along their closed cyclic path of travel, the bars are connected adjacent their inner ends to the upper end of a vertical arm 93 (Figures 2 and 3) having the lower end connected to a crank 94 identical to the crank 81. The crank 94 has a roller 95 engageable with a guide track 96 extending in alignment with the track 84 and secured to the frame structure 72. The crank 94 is connected to a pair of laterally spaced chains 97 in the same manner as the crank 81, shown in Figure 4 of the drawings, and the chains 97 are respectively aligned with the chains 88.

As shown in Figures 1 and 2 of the drawings the outer ends of the chains 97 respectively extend around sprockets 98 which are secured to a shaft 99 and the inner ends of the chains 97 respectively extend around sprockets 100 which are secured to a shaft 101. The sprocket shafts 99 and 101 are parallel to one another and to the sprocket shafts 90 and 92 previously described. The arrangement is such that movement of the arm 93 connected to the inner ends of the bars 73 is controlled in the same manner as the arm 78 connected to the outer ends of the bars 73. The chains 88 and 97 are driven in a direction to move the bars 73 in the direction of the arrow 102 in Figure 1 of the drawings. The driving means for the chains 88 and 97 comprise an electric motor 103 and a speed reducer 104 operatively connected to the drive shaft of the motor. The driven shaft of the speed reducer 104 is operaitvely connected to the sprocket shaft 101 for rotating the latter to drive the chains 97. The sprocket shaft 99 is operatively connected to the sprocket shaft 92 for rotating the chains 88. In the present instance the above connection is accomplished by securing a sprocket 105 to the front end of the shaft 99 and by connecting this sprocket with a chain 106 to a sprocket 107 secured to the shaft 92. The construction is such that the chains 88 and 97 are driven at the same rate of speed by the motor 103.

The transfer conveyor 25 is identical in construction to the transfer conveyor 24 with the exception that the transfer bars are moved in the opposite direction indicated in Figure 1 by the arrow 108. Hence, the parts of the transfer conveyor 25 which correspond to the parts of the transfer conveyor 24 are designated in the drawings by the same reference numerals.

The electric motor 103 associated with the transfer conveyor 24 is arranged in an electric circuit (not shown) with a limit switch 109 located directly opposite the receiving end of the transfer conveyor 24 in a position to be engaged by an article 29 on the conveyor 22. The limit switch 109 is normally open and is closed by movement of an article 29 to a position directly opposite the transfer conveyor 24. However, closing of the switch 109 does not necessarily start the electric motor 103 since the switch 109 is connected in series with a second limit switch 110 (Figure 11) mounted on a timing device 111 for actuation by the latter. As shown in Figures 1, 11, 12 and 13 of the drawings, the timing device 111 has a sprocket 112 secured to a drive shaft 113 for the timing mechanism and connected by a chain 114 to a sprocket 115 secured to the shaft 51. Since the shaft 51 also drives the conveyor 22, it follows that the timing mechanism 111 is driven in timed relationship to the conveyor 22. The timing mechanism 111 also has a driven shaft 116 and has a cam 117 secured to the driven shaft 116. The driven shaft 116 is operatively connected to the drive shaft 113 through the timing mechanism, not shown herein. The cam 117 is operatively associated with the limit switch 110 and is of a nature to close the limit switch 110 once during each complete rotation of the driven shaft 116.

It follows from the above that both the limit switches 109 and 110 must be closed in order to start the electric motor 103 and drive the transfer conveyor 24. The arrangement is such that the transfer conveyor 24 will not operate unless an article 29 is located by the conveyor 22 in a position directly opposite the receiving end of the transfer conveyor 24. Also, operation of the transfer conveyor 24 is delayed until the timing mechanism 111 closes the limit switch 110 and this timing mechanism is such that only certain of the articles on the conveyor 22 are transferred from this conveyor to the conveyor 23. For example, if it is desired to subject one out of ten articles 29 to a long or complete testing operation, the timing mechanism 111 is set to close the limit switch 110 at intervals when the tenth article 29 on the conveyor 22 registers with the transfer conveyor 24.

Operation of the electric motor 103 associated with the transfer conveyor 24, moves the bars 73 of this conveyor in the manner previously described throughout their closed cyclic path. As a result an article 29 is not only raised off of the conveyor 22 and deposited on the support 75 of the transfer conveyor 24, but in addition, an article 29 resting on the inner end of the support 75 is transferred to the long test conveyor 23. Upon completion of this transfer operation by the conveyor 24, the electric circuit to the motor 103 is opened to discontinue operation of the transfer conveyor 24. This is accomplished by a normally closed limit switch 118 located in a position to be opened by one of the chains 97 of the transfer conveyor 24.

In order to assure obtaining a proper relationship between the articles 29 on the conveyor 22 and the panels 57 on the conveyor 58, and at the same time permit transferring pre-selected articles 29 from the conveyor 22 to the conveyor 23, provision is made for accurately spacing the articles 29 as they are advanced from the loading conveyor 21 to the test conveyor 22. As shown in Figures 1, 8 and 10 of the drawings, a stop 119 is located between opposite sides of the conveyor 22 forwardly of the transfer conveyor 24. The stop 119 is positioned to be engaged by the pallets 30 on which the articles 29 are supported. As shown particularly in Figure 10 of the drawings, the stop 119 is pivoted by a pin 120 on a fixed frame part 121 in a manner to enable swinging movement of the stop 119 into and out of the path of travel of a pallet 30. The swinging end of the stop 119 is connected to the upper end of a plunger 122 and the lower end of the plunger is connected to an air cylinder 123 which is pivotally supported on the frame structure 121 for swinging movement.

The operation of the air cylinder 123 is also controlled by the timing mechanism 111 and for this purpose the timing mechanism has a second driven shaft 124 connected to a cam disc 125. Supported on the timing mechanism 111 in operative relationship to the disc 125 is a pair of limit switches 126 and 127. These limit switches are successively operated by a pair of cam elements 128 which are adjustably secured to the disc 125. The construction is such that rotation of the cam disc 125 in the direction of the arrow shown in Figure 13 operates the limit switch 126 which, in turn, operates a solenoid valve 129 to admit fluid under pressure to the upper end of the air cylinder 123 and to exhaust fluid under pressure from the lower end of the air cylinder 123. Thus the plunger 122 is moved downwardly to release the stop 119 from the adjacent pallet 30 enabling the article 29 on the pallet to be advanced along the conveyor 22. Continued rotation of the cam disc 125 operates the limit switch 127 to reverse the operation of the air cylinder 123 and thereby return the stop 119 to its blocking position with respect to the next adjacent pallet 30 on the conveyor 22. Thus the timing device 111 accurately controls the spacing of the articles 29 on the test conveyor 22.

In order to avoid operation of the stop 119 by the timing device 111 when for some reason an article 29 is not present, a normally open limit switch 130 is positioned to be closed by an article supporting pallet 30 when the latter assumes a position adjacent the stop 119. The limit switch 130 is electrically interlocked with the normally open limit switch 126 so that both switches must be closed before the stop 119 is lowered by the air cylinder 123 out of the path of travel of the articles 29.

The articles 29 being advanced along the test conveyor 23 operate a normally open limit switch 131 which is electrically interlocked with a limit switch 132. As shown in Figures 1, 6 and 7 of the drawings, the limit switch 132 is operated by an abutment 133 having a part overlying the conveyor 22 directly opposite the delivery end of the transfer conveyor 25 and having another part pivoted on a pin 134 at the outer side of the conveyor 22 permitting vertical swinging movement of the abutment. The two limit switches are electrically interlocked in a circuit with the electric motor 103 for driving the transfer conveyor 25 so that both limit switches 131 and 132 must be closed before the motor 103 is operated to drive the transfer conveyor 25. The limit switch 132 is held open by the abutment 133 when the latter is engaged by an article supporting pallet 30 so that operation of the transfer conveyor 25 cannot take place while an article 29 is positioned on the conveyor 22 opposite the receiving end of the transfer conveyor 25. In other words, the limit switch 132 assures that a space exists in the conveyor 22 for receiving an article 29 before the transfer conveyor 25 can operate to transfer an article on the conveyor 22.

The transfer conveyor 25 operates in the same manner as the conveyor 24 to transfer articles 29 from the conveyor 23 back to the conveyor 22. The operation of the transfer conveyor 25 is discontinued after each cycle of operation by a normally closed limit switch 135 connected in the electric circuit for the motor 103 of the transfer conveyor 25.

As a result of the operation of the article spacing mechanism including the stop 119 (Figure 10), a bank of articles 29 builds up at the front side of the stop 119 and are released one at a time by the stop at predetermined spaced intervals. During continued operation of the work handling system 20 it is possible that a subsantial number of articles may build up in a bank at the front side of the stop 119 and in order to overcome this possibility a normally open limit switch 136 is positioned to be closed by an article 29 on the conveyor 22 beyond the stop 119. The limit switch 136 is electrically connected to a timing device (not shown) which serves to open a circuit to an electric motor (not shown) for driving the conveyor 21.

The operation of the work handling system is believed apparent from the foregoing description. Briefly, however, articles 29 are moved onto the conveyor 22 from the loading conveyor 21 and are re-spaced by operation of the stop 119 so that the articles 29 approaching the transfer conveyor 24 assume a predetermined spaced relationship. While the articles 29 are in their predetermined spaced relationship they are advanced by the conveyor 22 along a relatively short test zone occupied by the panel conveyor 58. The panels 57 on the conveyor 58 are spaced from one another to register with the articles 29 and the conveyor 58 moves at the same speed as the conveyor 22. Thus, the articles 29 on the conveyor 22 may be tested while they are advanced by the conveyor 22.

As previously stated, it is desirable to subject certain of the articles 29 to a more thorough or longer test. In the present instance, for example, every tenth article 29 is lifted off the conveyor 22 onto the adjacent support 75 by the transfer conveyor 24 and, at the same time, an article 29 on the support 75 is transferred by the conveyor 24 to the conveyor 23. The conveyor 23 is driven at one tenth the speed of the conveyor 22 and this is also true of the panel conveyor 59. Thus, the panels carried by the conveyor 59 register with the articles 29 on the conveyor 23 and the latter articles are tested while they are being advanced by the conveyor 23. The relatively slow rate of travel of the conveyor 23 affords the additional time required to effect the longer test of the articles 29 on the conveyor 23 while these articles move throughout the same distance as the articles 29 on the conveyor 22. As the articles on the conveyor 23 reach the end of their travel, the transfer conveyor 25 is operated to transfer an article 29 from the support 75 to the conveyor 22. Under normal operating conditions, an empty space exists on the conveyor 22 opposite the transfer conveyor 25 due to the previous operation of the transfer conveyor 24 to lift an article 29 off the conveyor 22 and due to the accurate timing of the operation of the various conveyors with respect to one another.

What we claim as our invention is:

1. A work handling system comprising a transfer conveyor having an elongated lift device movable back and forth in the direction of its length, guide means spaced below the device and extending lengthwise of the device, operating arms having the upper ends respectively connected to the device at points spaced from one another lengthwise of the device, cranks having first pins respectively pivoted on the lower ends of the arms and having second pins offset with respect to the first pins, rollers on the second pins engageable with the guide means, operating means for the lift device movable throughout a closed cyclic path elongated in the direction of the guide means, and means connecting the operating means to the first pins of the cranks for moving the cranks back and forth along the guide means and for rotating the first pins about the axes of the second pins at the ends of the closed cyclic path of travel aforesaid.

2. The structure defined in claim 1 wherein the operating means comprises flexible linear members respectively movable throughout closed cyclic paths arranged in end to end relationship and wherein the connecting means respectively connect the members to the first pins of said cranks.

3. A work handling system comprising a transfer conveyor having an elongated lift device movable back and forth in the direction of its length, guide means spaced below the device and extending lengthwise of the device, an operating arm having the uper end connected to the device, a crank having a first pin pivotally connected to the lower end of the arm and having a second pin offset with respect to the first pin, a roller mounted on the second pin and engageable with the guide means, an endless flexible linear member extending in the direction of length of the device and supported to one side of the guide means with the opposite sides respectively spaced above and below the guide means, and a connector between the member and first pin of the crank.

4. A work handling system comprising a first conveyor movable along a predetermined path of travel and having provision for supporting articles, a second conveyor movable along a path of travel extending substantially parallel to the path of the first conveyor and carrying test panels spaced predetermined distances from one another along the path of the second conveyor, means for driving said conveyors at the same rate along their respective paths of travel, and means automatically operated in timed relationship with the movement of said conveyors for feeding articles to the first conveyor at such intervals that the articles on the first conveyor successively register with the test panels on the second conveyor.

5. The structure defined in claim 4 comprising a third conveyor having provision for advancing articles along a predetermined path of travel, means for transferring selected articles from the receiving end of the first conveyor to the third conveyor, means automaticaly operated in timed relation with the movement of said first conveyor for periodically actuating the transfer means at regular intervals, a fourth conveyor movable along a path of travel extending substantially parallel to the path of the third conveyor, means for driving the third and fourth conveyors at the same rate along their respective paths of travel, and test panels carried by the fourth conveyor and spaced from one another to successively register with the articles supported by the fourth conveyor.

6. The structure defined in claim 5 wherein the transfer means operates at such regular intervals that one article out of a predetermined number of consecutive articles are transferred from the first conveyor to the third conveyor.

7. The structure defined in claim 6 comprising a second transfer means for returning articles from the third conveyor to the first conveyor, and means for periodically operating the second transfer means at regular intervals.

8. The structure defined in claim 7 including control means for automatically operating the respective conveyors and the transfer means in such timed relationship to one another that the articles transferred to the third conveyor are returned by the second transfer means to the spaces on the first conveyor formerly occupied by said last-mentioned articles.

9. A work handling system comprising a first article supporting conveyor, means for driving said conveyor to advance the articles supported thereby, a second article supporting conveyor spaced laterally from the first conveyor and extending in the general direction of the first conveyor, means for driving said second conveyor to advance the articles supported thereby, a transfer conveyor extending between the first and second conveyors and having means for transferring articles from the first conveyor to the second conveyor, means automatically operated in timed relation with the movement of said first conveyor for periodically operating the transfer conveyor, a second transfer conveyor extending between the first and second conveyors in spaced relationship to the first transfer conveyor and having means for transferring articles from the second conveyor to the first conveyor, and means for periodically operating the second transfer conveyor.

10. The structure defined in claim 9 wherein the means for operating the second transfer conveyor is rendered operative by an article on the second conveyor in registration with the receiving end of said second transfer conveyor.

11. The structure defined in claim 10 comprising means operated by the presence of an article on the first conveyor in registration with the delivery end of the second transfer conveyor for rendering the operating means for the second transfer conveyor inoperative to start the second transfer conveyor.

12. A work handling system comprising a first article supporting conveyor, means for driving said conveyor to advance the articles supported thereby, a second article supporting conveyor spaced laterally from the first conveyor and extending in the general direction of the first conveyor, means for driving said second conveyor to advance the articles supported thereby, a transfer conveyor extending between the first and second conveyors and having means for transferring articles from the first conveyor to the second conveyor, means for periodically operating the transfer conveyor in timed relationship for movement on the first conveyor, a second transfer conveyor extending between the first and second conveyors in spaced relationship to the first transfer conveyor and having means for transferring articles from the second conveyor to the first conveyor, means for periodically operating the second transfer conveyor, and means operated by an article on the first conveyor in registration with the delivery end of the second transfer conveyor for rendering the operating means for the second transfer conveyor inoperative.

13. A work handling system comprising a first article supporting conveyor, means for driving said conveyor to advance the articles supported thereby, a second article supporting conveyor spaced laterally from the first conveyor and extending in the general direction of the first conveyor, a transfer conveyor extending between the first and second conveyors and having means for transferring articles from the first conveyor to the second conveyor, timing means automatically operated in timed relation with the movement of said first conveyor for periodically operating the transfer conveyor, and means controlled by the timing means for feeding articles to the first conveyor to provide a predetermined spaced relationship between adjacent articles on the first conveyor.

14. A work handling system comprising a first article supporting conveyor, means for driving said conveyor to advance the article supported thereby, a second article supporting conveyor spaced laterally from the first conveyor and extending in the general direction of the first conveyor, a transfer conveyor extending between the first and second conveyors and having means for transferring articles from the first conveyor to the second conveyor, and means for periodically operating the transfer conveyor in timed relationship to movement of the first conveyor, said operating means including timing mechanism operated by the movement of said first conveyor.

15. A work handling system comprising a first conveyor having means for supporting articles, means for driving said conveyor to advance the articles supported thereby, a second conveyor for loading articles on the receiving end of the first conveyor, means for controlling movement of articles from the loading conveyor onto the first conveyor to provide a predetermined spacing between adjacent articles on the first conveyor, a transfer conveyor positioned beyond the spacing means and having means for lifting articles off the first conveyor, and means for periodically operating the transfer conveyor including timing mechanism, the timing mechanism also operating the spacing means.

16. A work handling system comprising a first conveyor movable along a predetermined path of travel and having provision for supporting articles thereon in uniformly spaced relation in the direction of the path of travel, means for driving said conveyor, another conveyor movable along a predetermined path of travel spaced laterally from the path of travel of the first conveyor and parallel thereto having provision for supporting articles thereon in spaced relation in the direction of the path of travel of the other conveyor, means for transferring articles from the first conveyor to the said other conveyor, means for periodically actuating the transfer means at regular intervals such that one article out of a predetermined number of consecutive articles is transferred from said first conveyor to said other conveyor, a second transfer means for returning articles from said other conveyor to said first conveyor and being spaced from the first mentioned transfer means in the direction of travel of said conveyors, means for operating the second transfer means and control means for automatically operating the conveyors and the first and second transfer means in such timed relationship to one another that the articles transferred to said other conveyor are returned by said second transfer means to the spaces on said first conveyor formerly occupied by said last-mentioned articles.

17. A work handling system comprising laterally spaced article supporting conveyors, means for driving said conveyors to advance articles supported thereby, a transfer conveyor extending between said article supporting conveyors and having means for transferring an article from one article supporting conveyor to the other article supporting conveyor, means for periodically operating said transfer conveyor, and means operated by the presence of an article on the other article supporting conveyor in registration with the delivery end of said transfer conveyor for rendering said operating means inoperative.

18. A work handling system as defined in claim 17 in which the means for periodically operating said transfer conveyor is rendered operative by an article on said one article supporting conveyor in registration with the receiving end of said transfer conveyor.

19. A work handling system comprising a transfer conveyor having an elongated lift device movable back and forth in opposite directions, guide means extending in the direction of movement of said lift device, an operating arm having one end connected to said lift device, a crank having a first pin pivotally connected to the other end of said arm and having a second pin offset with respect to said first pin, said second pin being provided with means engageable with said guide means, operating means for said lift device movable through a closed cyclic path elongated in the direction of said guide means, and means connecting said operating means to said first pin for moving said crank back and forth along said guide means and for rotating said first pin about the axis of said second pin at the ends of the closed cyclic path of travel aforesaid.

20. A work handling system comprising a first conveyor movable along a predetermined path of travel and having provision for supporting articles, a second conveyor movable along a path of travel extending substantially parallel to the path of the first conveyor and carrying test panels spaced predetermined distances from one another along the path of the second conveyor, means for driving said conveyors at the same rate along their respective paths of travel, and means automatically operated in timed relationship with the movement of said conveyors for feeding articles to the first conveyor at such intervals that the articles on the first conveyor successively register with the test panels on the second conveyor, a third conveyor movable along a path of travel spaced from said first and second conveyors and having provision for supporting articles, means for transferring articles from the receiving end of said first conveyor to the third conveyor, and means automatically operated in timed relation with the movement of said first conveyor for periodically actuating said transfer means at regular intervals.

References Cited in the file of this patent

UNITED STATES PATENTS

| | | |
|---|---|---|
| 1,252,894 | Fitzgerald | Jan. 8, 1918 |
| 1,822,111 | Richardson et al. | Sept. 8, 1931 |
| 1,913,533 | Brunner | June 13, 1933 |
| 2,077,317 | Gerace | Apr. 13, 1937 |
| 2,352,779 | Ehrenfeld | July 4, 1944 |
| 2,576,369 | Sticelber | Nov. 27, 1951 |
| 2,676,691 | Temple | Apr. 27, 1954 |